United States Patent Office 2,769,731
Patented Nov. 6, 1956

2,769,731

FUNGICIDAL METAL SALTS OF PHTHALIC ACID

Alfred F. Schneid, New Milford, N. J., and Paul Resnick, Brooklyn, and Roy A. Pizzarello, Mount Vernon, N. Y., assignors to Interchemical Corporation, New York, N. Y., a corporation of Ohio No Drawing. Application July 30, 1953,
Serial No. 371,402

13 Claims. (Cl. 117—138.5)

This invention relates to fungicidal compounds which are especially useful for the rot- and mildew-proofing of textiles and similar materials. More particularly, the invention relates to new, solvent soluble condensation products between copper or zinc salts of phthalic acids as well as of chlorinated derivatives of phthalic acid and long chain aliphatic amines.

In the course of work with copper and zinc salts of phthalic acid, monochloro, dichloro and tetrachloro phthalic acid, we found these compounds to have excellent fungicidal properties and to be effective mildew-proofing agents if applied to textiles, wood, leather and other goods. Nevertheless, the utility of these compounds as fungicidal agents was found to be limited because of their insolubility in various organic solvents which are commonly used for imparting fungicidal agents to the material that is to be treated.

The compounds in question can be symbolized by the following generic formula:

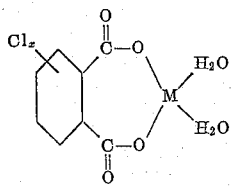

wherein $Cl_x$ indicates a possible replacement of one, two or four hydrogens of the hydrocarbon ring by chlorine atoms and the M stands for either copper or zinc.

We have discovered that chelated compounds of this character can be made soluble in various aliphatic and aromatic solvents when replacing one or both mols of water by a long chain aliphatic amine of the general formula $C_nH_{2n+1}NH_2$ in which $n$ is an integer not smaller than eight. Amines useful for this purpose are long chain amines such as octyl amine ($C_8H_{17}NH_2$), dodecyl amine ($C_{12}H_{25}NH_2$), octodecyl amine ($C_{18}H_{37}NH_2$), tetracosyl amine ($C_{24}H_{49}NH_2$) and others, as well as mixtures of such amines.

The following examples illustrate the methods of preparing the condensation products of the present invention. The term "parts" in the examples refers to "parts by weight."

Example 1

740 parts of phthalic anhydride are mixed into 10,000 parts of water and the mixture is heated, while stirring, to 90° C. until the phthalic anhydride is dissolved. At this point 1250 parts of copper sulfate ($CuSO_4 \cdot 5H_2O$) are added. The batch is stirred for another one-half hour after which time 5510 parts of 10% sodium carbonate solution are added. After heating for two hours to 90° C., the batch is cooled to room temperature and passed through a suction filter. The solids collected on the filter are washed with cold water until the washings are free of sulfate ions, as tested with barium chloride solution. After drying in an oven at 80° C., 870 parts of copper phthalate dihydrate are obtained.

Example 2

263 parts of copper phthalate dihydrate prepared according to the foregoing description are entered into a distilling unit to which is added 536 parts of octodecyl amine. Upon heating to 150° C., a condensation takes place between the octodecyl amine and the copper phthalate which is characterized by the liberation of water. The heating is continued until water ceases to distill over. During this process the reaction material undergoes a color change from violet to blue, green-blue, yellow and finally to yellow-brown. After completion of the condensation the reaction product is cooled to 100° C. and is diluted with 80 parts perchloro ethylene. The solvent concentrate of approximately 50 percent strength thus obtained is extendible in all proportions with Varsol (a refined petroleum hydrocarbon distillate of high mineral spirits range, having a boiling range from 161–198° C. and a sp. g. of 0.794), xylol, Solvesso 100 (an aromatic hydrocarbon distillate from petroleum having a boiling range from 160–172° C. and a sp. g. of 0.870), and any other aliphatic or aromatic solvent. These solvent solutions can be used in any desired concentration for mildew-proofing work.

In order to prepare condensation products similar to the foregoing from the zinc or copper hydrates of dichloro phthalic acid, we find it advantageous to use the 3,4- or 4,5-isomer or a mixture thereof. Upon the chlorination of phthalic anhydride, for example in oleum at a temperature below 60° C. in the presence of an iodine catalyst, a mixture of several isomers results, namely of the 3,6-, 3,4- and 4,5-dichloro phthalic anhydride, which are obtained at a ratio of about 50:35:15, while of the 4,6-isomer only traces are produced. In contrast to the other isomers which, ordinarily, form insoluble salts with zinc, copper and various other metals, the 3,6-dichloro phthalic anhydride not only fails to form insoluble salts with zinc or copper, but the presence of large amounts of the relatively highly ionized 3,6-isomer prevents the precipitation of zinc or copper salts of the 3,4- and 4,5-dichloro phthalate. For this reason, we prefer to separate the 3,6-dichloro phthalate from the two other isomers and the use of the latter, singly or in admixture, for the making of the zinc or copper hydrate and the subsequent condensation with long chain aliphatic amines. A convenient method for separating the 3,6-isomer from the others is disclosed by Villiger, Berichte 42: 3529–49 (1909).

Example 3

235 parts dichloro phthalic acid consisting of either the 3,4- or 4,5-isomer or a mixture thereof, are stirred into 2500 parts of water. The mixture is heated to 90° C. in order to effectuate solution. After adding 140 parts of zinc chloride to the hot solution and stirring for about one hour, the batch is cooled to room temperature, filtered and washed with cold water until the washings are free of chloride ions, as tested with silver nitrate solution. The filter cake consisting of zinc hydrate dichloro phthalic acid is dried in an oven at 80° C.

350 parts of the said zinc salt are charged into a distilling unit, together with 540 parts of octodecyl amine and 1,000 parts of Solvesso 100. The batch is heated to 145–150° C. until complete solution is effectuated. The condensation of zinc dichloro phthalate undergoes no color change. The solvent concentrate, which is almost water-white, can be used immediately for mildew-proofing work by extending it to any desired dilution with the addition of the same or of other aromatic solvents.

Example 4

A typical procedure in forming a copper-amine complex of this type is as follows: 332 parts of copper dichloro phthalate, made from a mixture of 3,4- and 4,5-dichloro phthalic acid treated with copper sulfate in the manner disclosed in Example 3, by substituting copper sulfate for the zinc chloride, are introduced into a distilling unit, along with 536 parts of octodecyl amine and about 90 parts of a high boiling aliphatic or aromatic solvent, such as pentachloroethane or trichlorobenzene. At this point, the high-boiling solvent is a solvent for the amine only, the chlorinated copper compound being present in dispersed form. The batch is heated to 150° C. while stirring, either with or without a reflux condenser, depending upon the boiling point of the particular solvent used. The temperature of 150° C. is maintained until 18 parts of water have been distilled off, indicating that one mol of water of the dihydrate has been replaced by the amine. During the condensation, the reaction material undergoes a color change from blue to greenish-blue and passes completely into solution.

If the heating is continued until 36 parts of water have been distilled off, both molecules of water of the hydrate are substituted by the long chain amine. Upon this continued heating the color change is to a final yellow-brown.

Either of these solutions represent concentrates which, after dilution with additional solvents, can be immediately applied to fabrics, such as canvas, in order to convey mildew resistant properties thereto.

The degree of solubility of the condensation product varies with the solvent employed. As a rule, it is more soluble in aromatic solvents than in aliphatic solvents. In order to work out a system whereby the final product can be cut with aliphatic solvents without impairing the solubility, it is necessary to use a strong aliphatic solvent in conjunction with the condensation. Such aliphatic solvents are, for example, perchloroethylene, pentachloroethane, nitropropane and other nitrated and halogenated aliphatic compounds. Having taken this precaution, the product can then be cut with textile spirits, mineral spirits and other low-powered solvents having K. B. values between 32 to 44. Similar precautions are unnecessary with aromatic solvent solutions which can be extended to any desired dilution by adding more of the same solvent or another cheap aromatic solvent such as xylol, toluene or benzene.

Example 5

In the alternative, the condensation can be carried out without the use of solvents. In this case the copper dichloro phthalate is added to a melt of a long chain aliphatic amine, such as octodecyl amine. The melt is heated to a temperature of 150° C. until a stoichiometric amount of water has been separated. The same color changes takes place as occurs when carrying out the condensation in a solvent medium.

Example 6

286 parts of tetrachloro phthalic anhydride are charged into 3,000 parts of water. After heating the batch to 90° C., 80 parts of sodium hydroxide are added. A stoichiometric amount of dilute sulfuric acid is added in order to change the disodium tetrachloro phthalate to the free tetrachloro phthalic acid. To the acid neutralized bath, which should test blue-black to Congo red, are added 255 parts of copper sulfate ($CuSO_4 \cdot 5H_2O$). The batch is kept at 90° C. for one hour while stirring. To neutralize the sulfuric acid split off, the batch is charged with 150 parts of anhydrous sodium acetate. After cooling to room temperature, the tetrachloro copper phthalate which has formed is filtered off, washed with cold water until the washings are free of sulfate ions, and is dried in an oven at 60° C.

383 parts of tetrachloro copper phthalate dihydrate are heated in a distilling unit with 540 parts of the mixture of long chain amines, having from 16 to 18 carbons per molecule. Upon reaching 150° C., this temperature is maintained until no more water distills over. During that period the reaction material undergoes a color change from violet to blue, blue-green, yellow and yellowish-brown. The reaction product is cooled to 100° C. at which temperature a chlorinated aliphatic solvent such as trichloro ethane is added in order to cut the material to a desired concentration and viscosity.

Example 7

To test the fungicidal properties of these compounds, canvas duck was padded with solvent solutions of the foregoing examples and was cured after padding. The amount of active copper imparted to the canvas duck was in no case less than 0.25% or more than 0.75%. The samples were buried in a soil box according to standard procedure along with a piece of untreated canvas. Upon removal from the soil box after 14 days, every one of the treated sample appeared to be unaffected and in good condition, in contrast to the untreated sample which was found to be completely deteriorated.

Example 8

A trichlorobenzene solution of dichloro copper phthalate, solubilized by condensation with octodecyl amine, the said solution having a dichloro copper phthalate content of 17.3% and an active copper content of 3.7%, was cut with xylol and incorporated into a padding liquor, for the padding of 12 ounce canvas duck which, after padding and curing for 15 minutes at 250° C., comprised 0.69% active copper. The material had a light tan color and a flexible hand. A comparison of the tensile strength gave the following results (average of five breaks on a 300 lb. vertical Scott tester).

|  | Tensile strength | |
|---|---|---|
|  | Warp | Fill |
| Unpadded | 133 | 98 |
| Padded | 123 | 91 |

After burying the samples for 14 days in a soil box, the unpadded control sample was found to be completely deteriorated, indicating good microbial activity in the soil. After removal of adhering dirt, and washing and conditioning the padded sample, a new test indicated a tensile strength of 124 (warp) and 97 (fill), thereby confirming the result of the visual examination, to the effect that the compound has excellent fungicidal properties.

Having described our invention, what we desire to secure by Letters Patent is:

1. A fungicidal composition having the following generic formula:

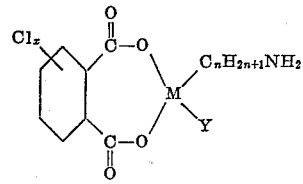

wherein $x$ is an integer replaceable by 0, 1, 2 and 4, M is a metal of the group consisting of copper and zinc, n in an integer not smaller than 8, and Y is a member of the group consisting of $H_2O$ and $C_nH_{2n+1}NH_2$.

2. A fungicidal composition according to claim 1, in which M stands for copper.

3. A fungicidal composition according to claim 1, consisting of a mixture of two different compounds in which the integer $x$ is 2, the chlorines of the two compounds standing in the 3,4- and 4,5-positions respectively.

4. A fungicidal composition according to claim 1, in which Y symbolizes $H_2O$.

5. A fungicidal composition according to claim 1, in which Y symbolizes $C_nH_{2n+1}NH_2$.

6. A fungicidal composition according to claim 1, in which the integer n symbolizes a mixture of long chain aliphatic amines having 8 and 10 carbons, respectively, per molecule.

7. The method of rot and mildewproofing a cellulosic textile which comprises impregnating the said textile in a solution of a compound of the following formula:

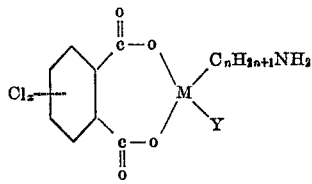

where $x$ is an integer replaceable by 0, 1, 2 and 4, M is a metal of the group consisting of copper and zinc, n is an integer not smaller than 8, and Y is a member of the group consisting of $H_2O$ and $C_nH_{2n+1}NH_2$ to deposit on the order of 0.25 to 0.75%, calculated as active copper, of said compound on the textile, and curing the impregnated textile.

8. The method of claim 7, where M is copper.

9. The method of claim 7 where $x$ is 2 and wherein the dichloro compound is a mixture of isomers containing the chlorine atoms are in the 3,4 and 4,5 positions respectively.

10. The method of claim 7 where Y is $H_2O$.

11. The method of claim 7 where Y is $C_nH_{2n+1}NH_2$.

12. The method of claim 7 where Y is a mixture of long chain aliphatic amines having 8 and 10 carbon atoms, respectfully, per molecule.

13. The improved rot and mildew proofed cellulosic textile resulting from the method of claim 1.

References Cited in the file of this patent

Beilstein, vol. 9, 4th edition, 1926, 796, 817–820.
Burkin: Chem. Soc. Jour. (London), 1950, pages 122–127.